US012451605B2

(12) United States Patent
Yu

(10) Patent No.: US 12,451,605 B2
(45) Date of Patent: Oct. 21, 2025

(54) ANTENNA STRUCTURE FOR MOBILE TERMINAL

(71) Applicant: JRD COMMUNICATION (SHENZHEN) LTD., Guangdong (CN)

(72) Inventor: Longjie Yu, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 353 days.

(21) Appl. No.: 18/255,371

(22) PCT Filed: Dec. 16, 2020

(86) PCT No.: PCT/CN2020/136715
§ 371 (c)(1),
(2) Date: Jun. 1, 2023

(87) PCT Pub. No.: WO2022/116273
PCT Pub. Date: Jun. 9, 2022

(65) Prior Publication Data

US 2024/0006768 A1 Jan. 4, 2024

(30) Foreign Application Priority Data

Dec. 2, 2020 (CN) ......................... 202011403272.8

(51) Int. Cl.
*H01Q 1/24* (2006.01)
*H01Q 5/335* (2015.01)
*H01Q 5/50* (2015.01)

(52) U.S. Cl.
CPC ............... *H01Q 5/50* (2015.01); *H01Q 1/241* (2013.01); *H01Q 5/335* (2015.01)

(58) Field of Classification Search
CPC .......... H01Q 5/50; H01Q 1/241; H01Q 5/335; H01Q 1/38; H01Q 5/371; H01Q 5/385;
(Continued)

(56) References Cited

U.S. PATENT DOCUMENTS 9,608,314 B1 3/2017 Kwon et al.
9,735,822 B1 8/2017 Kuo
(Continued)

FOREIGN PATENT DOCUMENTS

CN 107394351 A 11/2017
CN 108767499 A 11/2018
(Continued)

OTHER PUBLICATIONS

International Search Report in International application No. PCT/CN2020/136715,mailed on Sep. 14, 2021.
(Continued)

*Primary Examiner* — Dameon E Levi
*Assistant Examiner* — Michael M Bouizza
(74) *Attorney, Agent, or Firm* — PV IP PC; Wei Te Chung

(57) ABSTRACT

Embodiments of the present invention provide an antenna structure for a mobile terminal. The antenna structure comprises a first antenna to a sixth antenna, a matching circuit, and a feed point; a spacer region is provided between the first antenna and the second antenna; a fourth antenna is disposed on one side of the spacer region, the fifth and fourth antennas are disposed opposite to each other, and the third antenna and the feed point are disposed on the side edge of the fifth antenna; the fifth, sixth and third antennas are electrically connected, and the matching circuit is connected to the fifth antenna, the sixth antenna, the third antenna, and the feed point.

20 Claims, 6 Drawing Sheets

(58) Field of Classification Search
CPC .......... H01Q 9/42; H01Q 1/243; H01Q 1/242; H01Q 1/50; H01Q 1/521; H01Q 21/30
See application file for complete search history.

(56) References Cited

U.S. PATENT DOCUMENTS

| | | | | |
|---|---|---|---|---|
| 2013/0027254 | A1* | 1/2013 | Korva .................... | H01Q 5/371 343/866 |
| 2013/0162486 | A1 | 6/2013 | Korva et al. | |
| 2015/0380818 | A1 | 12/2015 | Svendsen et al. | |
| 2017/0033440 | A1 | 2/2017 | Kim et al. | |
| 2017/0338545 | A1 | 11/2017 | Guo | |
| 2018/0026334 | A1 | 1/2018 | Chen et al. | |
| 2018/0233807 | A1* | 8/2018 | Ma ..................... | H01Q 21/0075 |

FOREIGN PATENT DOCUMENTS

| | | | |
|---|---|---|---|
| CN | 109687105 | A | 4/2019 |
| CN | 109830815 | A | 5/2019 |
| CN | 209389215 | U | 9/2019 |
| CN | 110351404 | A | 10/2019 |
| CN | 110380197 | A | 10/2019 |
| CN | 110994156 | A | 4/2020 |
| CN | 210692740 | U | 6/2020 |
| CN | 111613905 | A | 9/2020 |
| CN | 111668604 | A | 9/2020 |
| CN | 211829200 | U | 10/2020 |

OTHER PUBLICATIONS

Written Opinion of the International Search Authority in International application No. PCT/CN2020/136715,mailed on Sep. 14, 2021.

Chinese Office Action issued in corresponding Chinese Patent Application No. 202011403272.8 dated Jul. 23, 2021, pp. 1-7.

Notification to Grant Patent Right for Invention issued in corresponding Chinese Patent Application No. 202011403272.8 dated Jan. 14, 2022, pp. 1-4.

* cited by examiner

ANTENNA STRUCTURE FOR MOBILE TERMINAL

CROSS REFERENCE TO RELATED APPLICATIONS

This application is a US national phase application based upon an International Application No. PCT/CN2020/136715, filed on Dec. 16, 2020, which claims priority of Chinese Application No. 202011403272.8, entitled "ANTENNA STRUCTURE FOR MOBILE TERMINAL", filed on Dec. 2, 2020. The entire disclosures of the above applications are incorporated herein by reference.

FIELD OF THE INVENTION

The present disclosure relates to the field of antenna technology, more particularly, to a mobile terminal antenna structure.

BACKGROUND

In the era of the 4th generation (4G), global positioning system level 1 (GPS L1) was the standard configuration for 4G smartphones, with L1 corresponding to a frequency of 1575 MHz. With the arrival of the 5th Generation (5G) era, a dual global positioning system (GPS) has become the standard configuration for more and more 5G smartphones. In other words, based on GPS L1, global positioning system level 5 (GPS L5) has been added, with L5 corresponding to a frequency of 1176 MHz. When using 5G smartphones for positioning, two GPS receivers work simultaneously, greatly increasing positioning accuracy. For the antenna of 5G smartphones, to achieve dual GPS functionality, an existing design solution is to integrate GPS L1 and Wi-Fi functions with one antenna, and GPS L5 and Wi-Fi functions with the other antenna. Another existing design solution is for one antenna to integrate GPS L1 and Wi-Fi functions, while the other antenna only performs GPS L5 functions. The existing antenna design scheme can achieve the function of dual GPS, but at least 2 antennas are required. Two slots need to be opened in the metal machine or film injection molding machine, which will weaken the structural strength of the phone. If it is a metal machine, it will also affect the appearance of the metal machine.

Therefore, the existing technology has defects and needs improvement.

SUMMARY OF INVENTION

Technical Problem

Problem Solution

Technical Solution

One embodiment of the present disclosure is directed to an antenna structure for a mobile terminal. The antenna structure integrates the functions of GPS L1, GPS L5, Wi-Fi 2.4G, Wi-Fi 5G, and long-term evolution (LTE) B32 through an antenna, which may enhance the structural strength and visual appearance of the mobile terminal, with good free space and head to hand performance.

According a first aspect of the present disclosure, an antenna structure for a mobile terminal includes a first antenna, a second antenna, a third antenna, a fourth antenna, a fifth antenna, a sixth antenna, a matching circuit, and a feed point.

A spacing area is disposed between one end of the first antenna and one end of the second antenna.

A side portion of the spacing area is provided with the fourth antenna, which is parallel to the second antenna, one end of the fifth antenna is opposite to one end of the fourth antenna, a side portion of the fifth antenna is provided with the third antenna, which is parallel to the second antenna, the sixth antenna is connected to the third antenna, and a side portion of the third antenna is provided with the feed point.

The third antenna is at least partially arranged in parallel with the fourth antenna and at least partially arranged in parallel with the first antenna.

The fifth antenna, the sixth antenna, and the third antenna are electrically connected and intersected at a point, one end of the matching circuit is connected to the fifth antenna, the sixth antenna, and the third antenna, and the other end of the matching circuit is connected to the feed point.

Furthermore, the first antenna is a curved antenna, which comprises a first part antenna and a second part antenna, the spacing area is disposed between one end of the second part antenna and one end of the second part antenna, and the other end of the second part antenna is connected to the first part antenna.

The sixth antenna comprises the third antenna, the fourth antenna and the fifth antenna, the fifth antenna is relatively parallel to the fourth antenna, which is relatively parallel to the second antenna, and the third antenna is relatively parallel to the first antenna.

Furthermore, a length of the first part antenna ranges between 13 mm and 17 mm, and a length of the second part antenna ranges between 10 mm to 14 mm.

Furthermore, a distance between the first part antenna and a frame connected area in the mobile terminal metal ranges between 7 mm and 9 mm, and a distance between the second antenna and the frame connected area in the mobile terminal metal ranges 5 mm to 7 mm.

Furthermore, a width of a slot is 1 mm.

Furthermore, a length of the fourth antenna ranges between 2.5 mm and 3.5 mm, and a distance between the fourth antenna and the second antenna ranges between 0.4 mm to 0.6 mm.

Furthermore, the fifth antenna comprises the sixth antenna and a seventh antenna, the sixth antenna is vertically connected to the seventh antenna, one end of the sixth antenna is opposite to one end of the fourth antenna, the sixth antenna is parallel to the second antenna, and the seventh antenna is parallel to the first antenna, a distance between a sixth part antenna and the second antenna ranges between 0.4 mm to 0.6 mm, and a seventh part antenna, the sixth antenna, and the third antenna are intersected at a point.

Furthermore, a length of the second antenna ranges between 25 mm to 29 mm.

Furthermore, the fifth antenna, the fourth antenna, the sixth antenna, and the third antenna are LDS antennas.

Furthermore, the first antenna and the second antenna are metal frame antennas.

According a second aspect of the present disclosure, an antenna structure for a mobile terminal includes a first antenna, a second antenna, a third antenna, a fourth antenna, a fifth antenna, a sixth antenna, a matching circuit, and a feed point.

A spacing area is disposed between one end of the first antenna and one end of the second antenna.

A side portion of the spacing area is provided with the fourth antenna, which is parallel to the second antenna, one end of the fifth antenna is opposite to one end of the fourth antenna, a side portion of the fifth antenna is provided with the third antenna, which is parallel to the second antenna, the sixth antenna is connected to the third antenna, and a side portion of the third antenna is provided with the feed point.

The third antenna is at least partially arranged in parallel with the fourth antenna and at least partially arranged in parallel with the first antenna.

The fifth antenna, the sixth antenna, and the third antenna are electrically connected and intersected at a point, one end of the matching circuit is connected to the fifth antenna, the sixth antenna, and the third antenna, and the other end of the matching circuit is connected to the feed point.

A length of the third antenna ranges between 5 mm and 7 mm.

Furthermore, the first antenna is a curved antenna, which comprises a first part antenna and a second part antenna, the spacing area is disposed between one end of the second part antenna and one end of the second part antenna, and the other end of the second part antenna is connected to the first part antenna.

The sixth antenna comprises the third antenna, the fourth antenna and the fifth antenna, the fifth antenna is relatively parallel to the fourth antenna, which is relatively parallel to the second antenna, and the third antenna is relatively parallel to the first antenna.

Furthermore, a length of the first part antenna ranges between 13 mm and 17 mm, and a length of the second part antenna ranges between 10 mm to 14 mm.

Furthermore, a distance between the first part antenna and a frame connected area in the mobile terminal metal ranges between 7 mm and 9 mm, and a distance between the second antenna and the frame connected area in the mobile terminal metal ranges 5 mm to 7 mm.

Furthermore, a width of a slot is 1 mm.

Furthermore, a length of the fourth antenna ranges between 2.5 mm and 3.5 mm, and a distance between the fourth antenna and the second antenna ranges between 0.4 mm to 0.6 mm.

Furthermore, the fifth antenna comprises the sixth antenna and a seventh antenna, the sixth antenna is vertically connected to the seventh antenna, one end of the sixth antenna is opposite to one end of the fourth antenna, the sixth antenna is parallel to the second antenna, and the seventh antenna is parallel to the first antenna, a distance between a sixth part antenna and the second antenna ranges between 0.4 mm to 0.6 mm, and a seventh part antenna, the sixth antenna, and the third antenna are intersected at a point.

Furthermore, a length of the second antenna ranges between 25 mm to 29 mm.

Furthermore, the fifth antenna, the fourth antenna, the sixth antenna, and the third antenna are LDS antennas.

Furthermore, the first antenna and the second antenna are metal frame antennas.

Embodiments of the present disclosure are directed to an antenna structure for a mobile terminal. The antenna structure includes a first antenna, a second antenna, a third antenna, a fourth antenna, a fifth antenna, a sixth antenna, a matching circuit, and a feed point. A spacing area is disposed between one end of the first antenna and one end of the second antenna. A side portion of the spacing area is provided with the fourth antenna, which is parallel to the second antenna, one end of the fifth antenna is opposite to one end of the fourth antenna, a side portion of the fifth antenna is provided with the third antenna, which is parallel to the second antenna, the sixth antenna is connected to the third antenna, and a side portion of the third antenna is provided with the feed point. The third antenna is at least partially arranged in parallel with the fourth antenna and at least partially arranged in parallel with the first antenna. The fifth antenna, the sixth antenna, and the third antenna are electrically connected and intersected at a point, one end of the matching circuit is connected to the fifth antenna, the sixth antenna, and the third antenna, and the other end of the matching circuit is connected to the feed point. The embodiments of the present disclosure provides a metal frame antenna coupling with a laser direct structuring (LDS) antenna installed on a plastic bracket of a mobile terminal to form a five-in-one antenna (i.e., one antenna integrates the functions of GPS L1, GPS L5, Wi-Fi 2.4G, Wi-Fi 5G, and LTE B32). Only one antenna is needed to achieve dual GPS (GPS L1 and GPS L5) function, compared to using at least two antennas to achieve dual GPS function. A plurality of slots on mobile terminals of the metal machine or film injection molding machine type has been reduced, thereby improving the structural strength and visual appearance of the mobile terminal. In addition, since the five-in-one antenna is located in the upper left corner area on the back of the mobile terminal, it is less affected by the head and hand, and therefore, the performance is also good.

Advantageous Effect

BRIEF DESCRIPTION OF THE DRAWINGS

Description of Drawings

Figure 1:
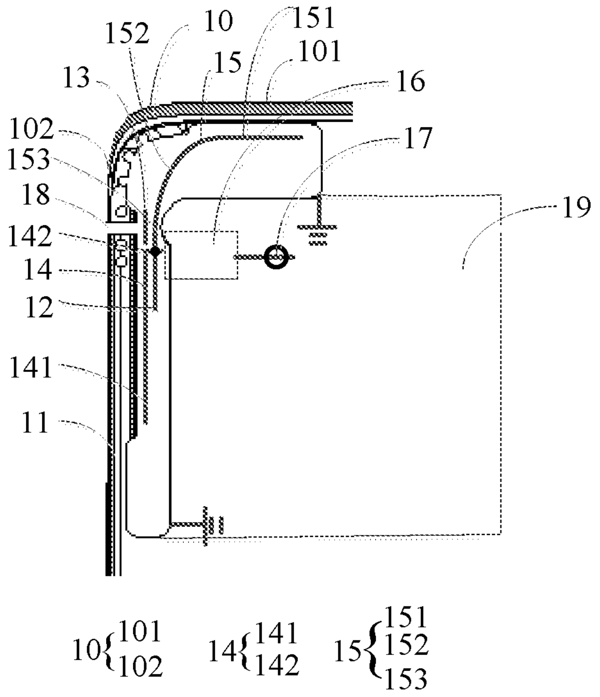

FIG. 1 is a schematic diagram of a structure of a mobile terminal antenna according to one embodiment of the present disclosure.

Figure 2:
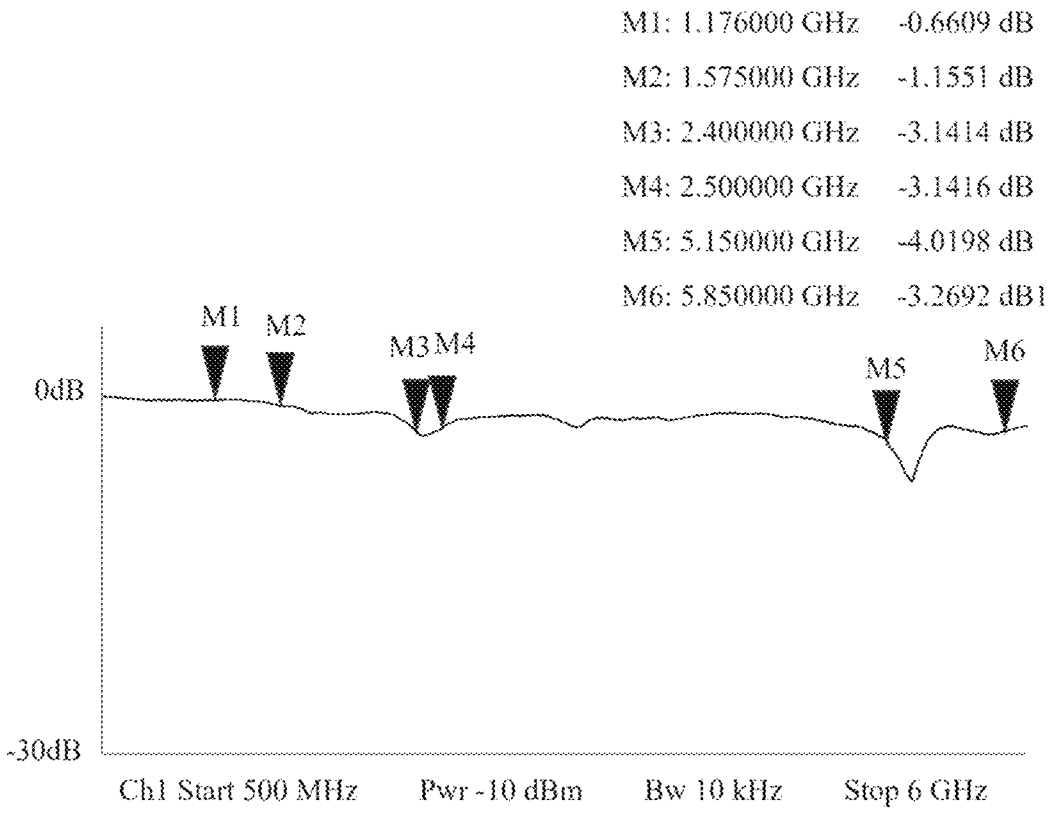

FIG. 2 illustrates a return loss diagram of 2.4 GHz shallow resonance according to one embodiment of the present disclosure.

Figure 3:
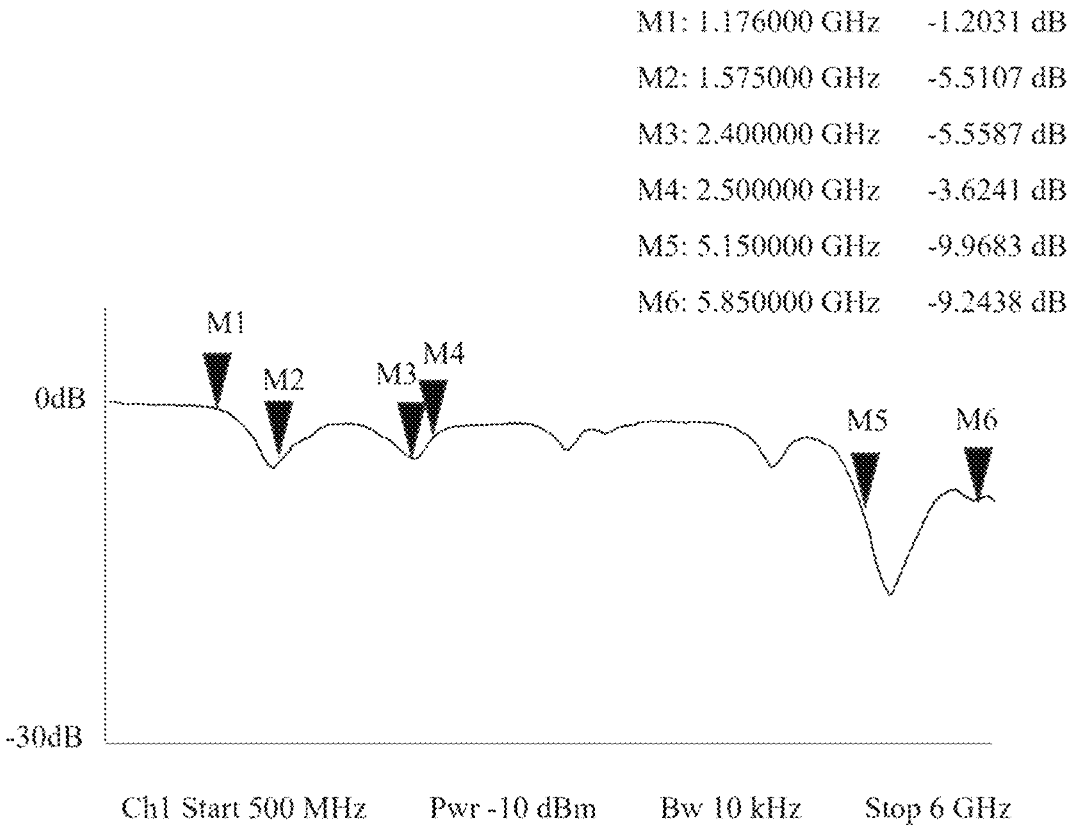

FIG. 3 illustrates the return loss diagram of 2.4 GHz and 1.5 GHz resonance according to one embodiment of the present disclosure.

Figure 4:
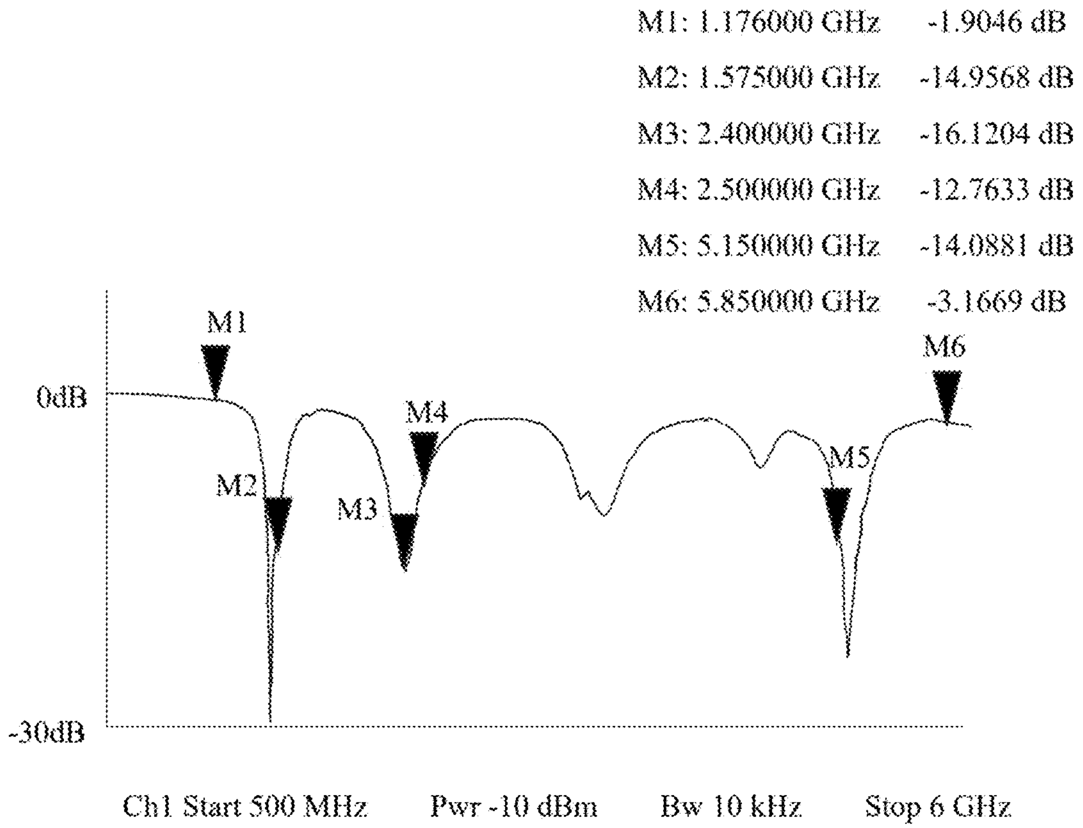

FIG. 4 illustrates the return loss diagram according to one embodiment of the present disclosure with an addition of LTE B32 antenna and Wi-Fi 5G antenna.

Figure 5:
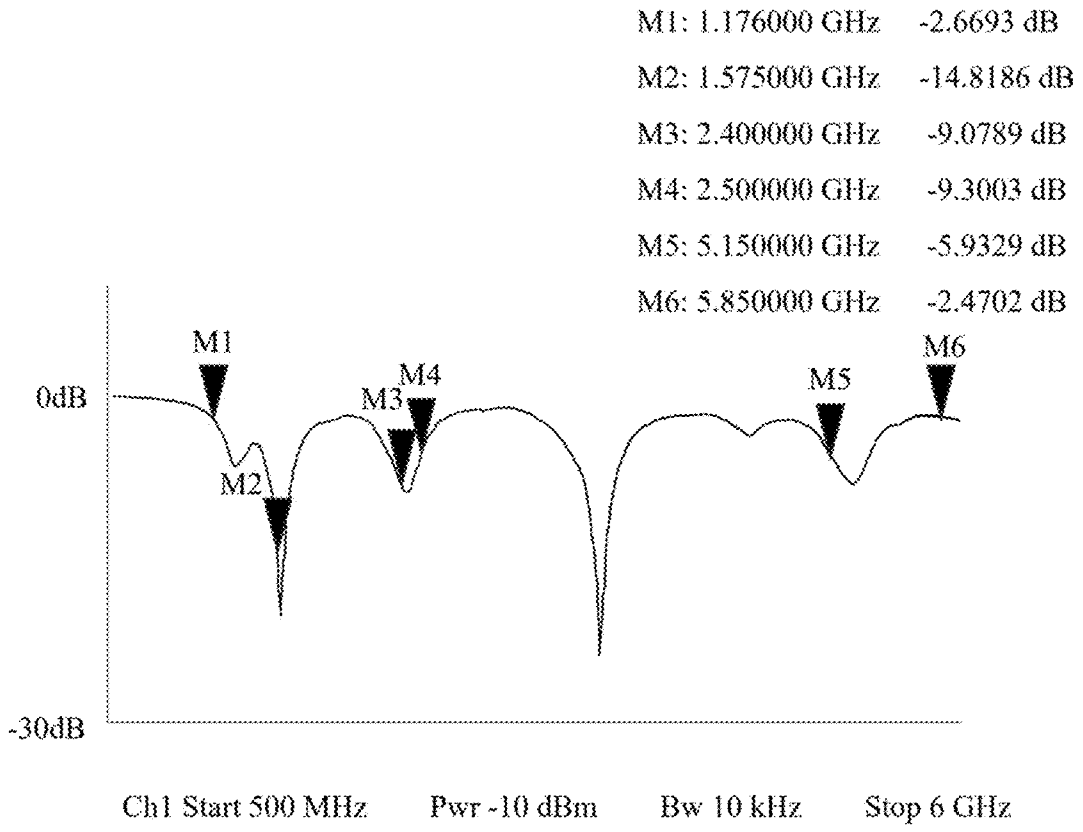

FIG. 5 illustrates the return loss diagram according to one embodiment of the present disclosure after coupling inductance.

Figure 6:
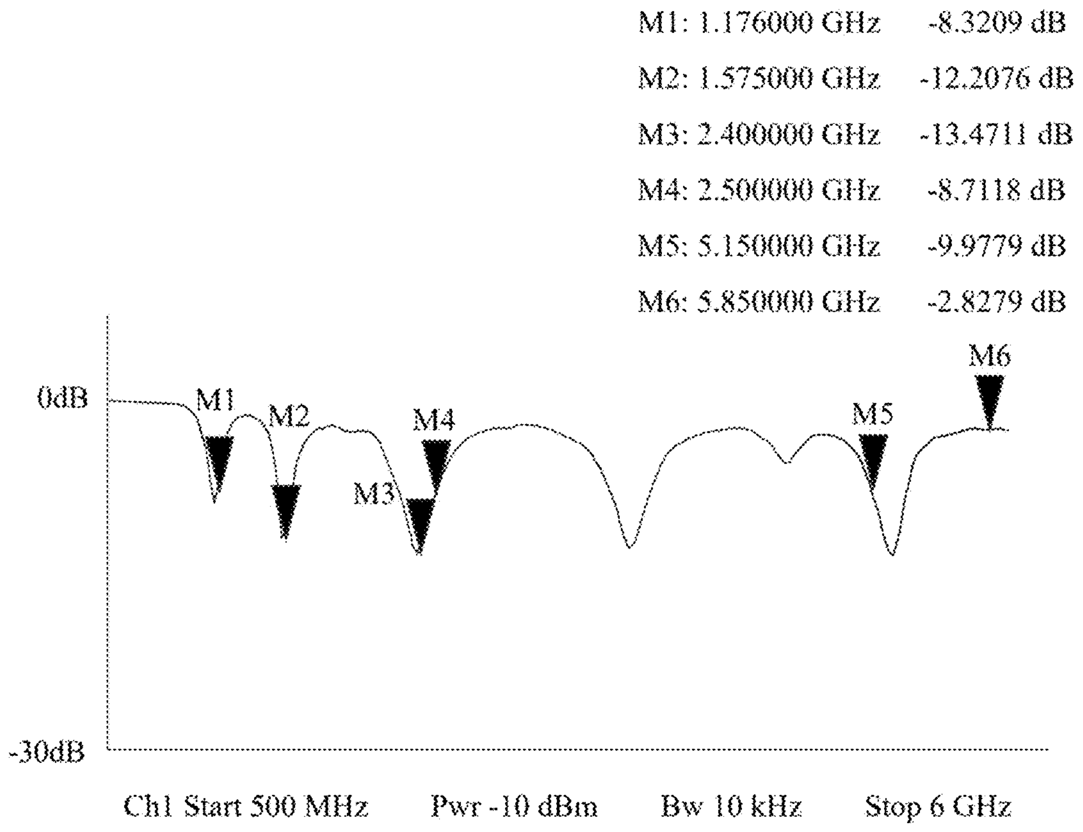

FIG. 6 illustrates an echo loss diagram according to one embodiment of the present disclosure after adding a complete matching circuit.

DESCRIPTION OF THE EMBODIMENTS

The embodiments of the present disclosure are described in detail hereinafter. Examples of the described embodiments are given in the accompanying drawings, wherein the identical or similar reference numerals constantly denote the identical or similar elements or elements having the identical or similar functions. The specific embodiments described with reference to the attached drawings are all exemplary and are intended to illustrate and interpret the present disclosure, which shall not be construed as causing limitations to the present disclosure.

In the description of the present disclosure, it should be understood that terms such as “center,” “longitudinal,” “lateral,” “length,” “width,” “thickness,” “upper,” “lower,” “front,” “rear,” “left,” “right,” “vertical,” “horizontal,”

"top," "bottom," "inside," "outside," "clockwise," "counter-clockwise" as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure. In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two, unless otherwise specified.

In the description of the present disclosure, it should be noted that unless there are express rules and limitations, the terms such as "mount," "connect," and "bond" should be comprehended in broad sense. For example, it can mean a permanent connection, a detachable connection, or an integrate connection; it can mean a mechanical connection, an electrical connection, or can communicate with each other; it can mean a direct connection, an indirect connection by an intermediate, or an inner communication between two elements. A person skilled in the art should understand the specific meanings in the present disclosure according to specific situations.

In the description of the present disclosure, unless specified or limited otherwise, it should be noted that, a structure in which a first feature is "on" or "beneath" a second feature may include an embodiment in which the first feature directly contacts the second feature and may also include an embodiment in which an additional feature is formed between the first feature and the second feature so that the first feature does not directly contact the second feature. Furthermore, a first feature "on," "above," or "on top of" a second feature may include an embodiment in which the first feature is right "on," "above," or "on top of" the second feature and may also include an embodiment in which the first feature is not right "on," "above," or "on top of" the second feature, or just means that the first feature has a sea level elevation greater than the sea level elevation of the second feature. While first feature "beneath," "below," or "on bottom of" a second feature may include an embodiment in which the first feature is right "beneath," "below," or "on bottom of" the second feature and may also include an embodiment in which the first feature is not right "beneath," "below," or "on bottom of" the second feature, or just means that the first feature has a sea level elevation less than the sea level elevation of the second feature.

The disclosure herein provides many different embodiments or examples for realizing different structures of the present disclosure. In order to simplify the disclosure of the present disclosure, components and settings of specific examples are described below. Of course, they are only examples and are not intended to limit the present disclosure. Furthermore, reference numbers and/or letters may be repeated in different examples of the present disclosure. Such repetitions are for simplification and clearness, which per se do not indicate the relations of the discussed embodiments and/or settings. Moreover, the present disclosure provides examples of various specific processes and materials, but the applicability of other processes and/or application of other materials may be appreciated by a person skilled in the art.

Please refer to FIG. 1, one embodiment of the present disclosure is directed to a mobile terminal antenna structure, which comprises a first antenna, a second antenna, a third antenna, a fourth antenna, a fifth antenna, a sixth antenna, a matching circuit 16, and a feed point 17.

A spacing area 18 is disposed between one end of the first antenna 10 and one end of the second antenna 11.

The fourth antenna 13 is disposed on a side portion of the spacing area 18, which is parallel to the second antenna 11, one end of the fifth antenna 14 is opposite to one end of the fourth antenna 13, a side portion of the fifth antenna 14 is provided with the third antenna 12, which is parallel to the second antenna 11, the sixth antenna 15 is connected to the third antenna 12, and a side portion of the third antenna 12 is provided with the feed point 17.

The third antenna 12 is at least partially arranged in parallel with the fourth antenna 13 and at least partially arranged in parallel with the first antenna 10.

The fifth antenna 14, the sixth antenna 15, and the third antenna 12 are electrically connected and intersected at a point. One end of the matching circuit 16 is connected to the fifth antenna 14, the sixth antenna 15, and the third antenna 12, and the other end of the matching circuit 16 is connected to the feed point 17.

As illustrated in FIG. 1, the fourth antenna 13 is disposed on the right side of a slot 18, the fifth antenna 14 is disposed below the fourth antenna 13, the third antenna 12 is disposed on the right side of the fifth antenna 14, the sixth antenna 15 is disposed on the top of the third antenna 12, and one end of the sixth antenna 15 is connected to one end of the third antenna 12, and the feed point 17 is disposed on the right side of the third antenna 12.

Without an LDS antenna (the third antenna 12, the fourth antenna 13, the fifth antenna 14, and the sixth antenna 15), a coupling of the feed points 17 with the first antenna 10 and the second antenna 11 will produce a shallow resonance of 2.4 GHz (as illustrated in FIG. 2). Based on shallow resonance at 2.4 GHz, coupling the fifth antenna 14 with the second antenna 11 will generate a new resonance near 1.5 GHz, as illustrated in FIG. 3. The resonance labeled M1 to M2 is a 1.5 GHz resonance. A length of the fifth antenna 14 is 15 mm, which means a coupling length disposed between the fifth antenna 14 and the second antenna 11 is 15 mm. The coupling length is crucial and needs to be adjusted to generate the resonance near 1.5 GHz. If the coupling length is too long, the resonance will disappear. If the coupling length is too short, a bandwidth of the resonance will be reduced. Adding the sixth antenna 15 may deepen the resonance of 1.5 GHz. The function of the sixth antenna 15 is to adjust the resonance of 1.5 GHz. If the sixth antenna 15 is too long, the resonance will become shallow and shift toward low frequency. The function of the third antenna 12 is to adjust the resonance of Wi-Fi 5G. If the third antenna 12 is too long, the resonance will become shallow and shift toward low frequency. The length range of the third antenna 12 is 5 mm to 7 mm, as illustrated in FIG. 4. From the figures mentioned above, it may also be seen that the resonance of Wi-Fi 2.4G and Wi-Fi 5G is significantly deepened. Based on the first antenna 10, the second antenna 11, the third antenna 12, the fourth antenna 13, the fifth antenna 14, and the sixth antenna 15, add the matching circuit 16, that is, starting from the antenna end, connect a 2.4 nH inductance first, and then connect a 1.5 pF capacitor. The role of an inductance may be described as pulling a resonance point of GPS L1 and GPS L5 from the third quadrant to the first quadrant from the Smith chart. As illustrated in FIG. 5, two resonances located at 1.3 GHz and 1.6 GHz were separated from the 1.5 GHz resonance. The function of capacitance may be described as: from the Smith circle diagram, the resonance points of GPS L1 and GPS L5 are pulled from the first quadrant to near the center point, and from FIG. 6, the resonance points of 1.3 GHz and 1.6 GHz are pulled to near the frequency points of GPS L1 and GPS L5. It should be noted that since the frequency points of LTE B32 and GPS L1 are similar, it can be considered that the antenna performance of LTE B32 and GPS L1 is similar. Therefore, in general, the implementation order of the five-in-one antenna is to first generate Wi-Fi 2.4 GHz resonance, then generate 1.5 GHz resonance. Then, by adjusting the antenna matching circuit, the 1.5 GHz resonance is divided into GPS L1 and GPS L5 resonance, and finally, a length of the LDS antenna is adjusted to generate Wi-Fi 5G resonance.

The first antenna 10 is a curved antenna, which comprises a first part antenna 101 and a second part antenna 102. A spacing area 18 is disposed between one end of the second part antenna 102 and one end of the second antenna 11, and the other end of the second part antenna 102 is connected to the first part antenna 101.

The sixth antenna 15 comprises the third antenna 151, the fourth antenna 152, and the fifth antenna 153. The fifth antenna 153 is relatively parallel to the fourth antenna 13, which is relatively parallel to the second antenna 102, and the third antenna 151 is relatively parallel to the first antenna 101.

The first antenna 10 is composed of the first part antenna 101 and the second part antenna 102. The first part antenna 101 is located above the mobile terminal, the second part antenna 102 is located on a side portion of the mobile terminal, and the second antenna 11 is also located on the side portion of the mobile terminal. Among them, the first antenna and the second antenna 11 are metal frame antennas. By simply setting a slot 18 between one end of the second part antenna 102 and the second antenna 11, the five-in-one antenna formed by coupling the metal frame antenna and the LDS antenna disposed on a plastic bracket of the mobile terminal may achieve a dual GPS (GPS L1 and GPS L5) function. Compared to using at least two antennas to achieve the dual GPS function, a plurality of slots on the mobile terminal is reduced, thereby improving the structural strength and visual appearance of the mobile terminals.

Optionally, a length range of the first part antenna 101 is 13 mm to 17 mm, and a length range of the second part antenna 102 is 10 mm to 14 mm.

Without the addition of the LDS antenna, the coupling of feed points 17 with the first antenna 10 and the second antenna 11 generates a shallow resonance of 2.4 GHz, as illustrated in FIG. 2. The resonance labeled M3 to M4 in the figure is a Wi-Fi 2.4 GHz resonance, and the length of the first antenna 10 and the second antenna 11 will affect the frequency of the shallow resonance. That is to say, if the first antenna 10 is lengthened, the shallow resonance will shift to the low frequency. If the first antenna 10 is shortened and the second antenna 11 is lengthened, the shallower resonance is biased towards high frequency. If the second antenna 11 is shortened, the shallower resonance is biased towards low frequency. Therefore, it is necessary to comprehensively adjust the first antenna 10 and the second antenna 11 to a suitable length, so that the shallower resonance falls precisely around 2.4 GHz. Therefore, the length range of the first part of antenna 101 is 1 3 mm to 17 mm, and the length range of the second part of antenna 102 is 10 mm to 14 mm. Among them, when the length of the first part antenna 101 is set to 15 mm, the corresponding length of the second part antenna 102 is set to 12 mm, and the corresponding length of the second antenna 11 is set to 27 mm, so that the shallower resonance may fall exactly near 2.4 GHz. In addition, the farther the distance disposed between the feed point 17 and the second antenna 11, the shallower resonance will shift towards low frequency. The closer the distance disposed between the feed point 17 and the second antenna 11, the shallower resonance will shift towards high frequency. Therefore, the setting of the feed point 17 position also needs to be considered.

Optionally, a distance range disposed between the first part of antenna 101 and a metal frame connection area 19 of the mobile terminal is 7 mm to 9 mm, and a distance range disposed between the second antenna 11 and the metal frame connection area 19 of the mobile terminal is 5 mm to 7 mm.

Among them, setting the distance range is mainly to ensure the performance of the five-in-one antenna and prevent excessive interference from the metal frame connection area 19. Among them, the distance disposed between the first part of antenna 101 and the metal frame connection area 19 of the mobile terminal is 8 mm, while the distance disposed between the second antenna 11 and the metal frame connection area 19 of the mobile terminal is 6 mm, which is an optimal distance. The distance may make the performance of the five-in-one antenna the best.

Optionally, a width of the slot 18 is 1 mm.

Because adding the fifth antenna 14 on the side portion of the mobile terminal antenna bracket will add a new 1.5 GHz resonance, which mainly leans towards the frequency point of GPS L1 and energy of GPS L5 is weaker. In order to enhance the energy of the GPS L5 frequency point, it is necessary to enhance a coupling disposed between the first antenna 10 and the second antenna 11, so that the resonance of 1.5 GHz deviates to the low frequency by about 50 MHz. To enhance the coupling disposed between the metal frame antenna 10 and the second antenna 11, the distance disposed between the first antenna 10 and the second antenna 11 may be adjusted by adjusting the width of slot 18 to 1 mm, which may enhance the coupling disposed between the first antenna 10 and the second antenna 11, thereby enhancing the energy of GPS L5 frequency points. In addition, there are other methods to enhance the coupling disposed between the first antenna 10 and the second antenna 11. For example, increase a positive area disposed between the first antenna 10 and the second antenna 11, that is, increase the positive area disposed between one end of the second antenna 102 and the second antenna 11. For example, increase the fourth antenna 13, and make the area of the fourth antenna 13 cover part of the second antenna 102 and the second antenna 11.

A length range of the fourth antenna 13 is from 2.5 mm to 3.5 mm, and a distance range disposed between it and the second antenna 11 is from 0.4 mm to 0.6 mm.

Since the slot 18 disposed between one end of the second antenna 102 and the second antenna 11 is 1 mm wide, the length range of the fourth antenna 13 is set to 2.5 mm to 3.5 mm, so that the area of the fourth antenna 13 may cover part of the second antenna 102 and the second antenna 11, thus enhancing the coupling disposed between the first antenna 10 and the second antenna 11, thereby enhancing the energy of the GPS L5 frequency point. In addition, the length range (2.5 mm to 3.5 mm) of the fourth antenna 13 and the distance range (0.4 mm to 0.6 mm) disposed between the fourth antenna 13 and the second antenna 11 may ensure the optimal performance of the five-in-one antenna. The optimal length of the fourth antenna 13 is 3 mm, and the optimal distance disposed between the fourth antenna 13 and the second antenna 11 is 0.5 mm.

The fifth antenna 14 comprises the sixth antenna 141 and a seventh antenna 142. The sixth antenna 141 and the seventh antenna 142 are vertically connected. One end of the sixth antenna 141 is opposite to one end of the fourth antenna 13. The sixth antenna 141 is parallel to the second antenna 11, and the seventh antenna 142 is parallel to the first antenna 101. The distance range disposed between the sixth part antenna 141 and the second antenna 11 is 0.4 mm to 0.6 mm, and the seventh part antenna 142, the sixth antenna and third antenna 12 are intersected at a point.

Setting the distance range disposed between the sixth part antenna 141 and the second antenna 11 to 0.4 mm to 0.6 mm ensures the optimal performance of the five-in-one antenna. The optimal distance disposed between the sixth part antenna 141 and the second antenna 11 is 0.5 mm.

In some embodiments, the length range of the second antenna 11 is 25 mm to 29 mm.

Without the addition of an LDS antenna, the coupling of the feed points 17 with the first antenna 10 and the second antenna 11 generates a shallow resonance of 2.4 GHz, as illustrated in FIG. 2. The resonance labeled M3 to M4 in the figure is a Wi-Fi 2.4 GHz resonance, and the length of the first antenna 10 and the second antenna 11 will affect the frequency of the shallow resonance. That is to say, if the first antenna 10 is lengthened, the shallow resonance will shift to the low frequency. If the first antenna 10 is shortened and the second antenna 11 is lengthened, the shallower resonance will shift towards high frequency. If the second antenna 11 is shortened, the shallower resonance will shift towards high frequency. Therefore, it is necessary to comprehensively adjust the first antenna 10 and the second antenna 11 to a suitable length, so that the shallower resonance is located near 2.4 GHz. Therefore, the length range of the second antenna 11 is set to 25 mm to 29 mm. Among them, when the length of the second antenna 11 is set to 27 mm, the corresponding length of the first part antenna 101 is set to 15 mm, and the corresponding length of the second part antenna 102 is set to 12 mm, so that the shallower resonance can fall exactly near 2.4 GHz.

The fifth antenna 14, the fourth antenna 13, the sixth antenna 15, and the third antenna 12 are LDS antennas.

LDS antenna technology, also known as laser direct construction, utilizes a computer to control a motion of the laser according to a trajectory of conductive patterns, and projects the laser onto a molded three-dimensional plastic device. Within a few seconds, a circuit pattern is activated. Simply put, for the design and production of mobile phone antennas, a metal antenna pattern is directly formed by laser plating on the formed plastic bracket using laser technology. The use of LDS antennas not only ensures stable antenna performance and good consistency, but also enhances the utilization of mobile terminal space, allowing the body of the mobile terminal to achieve a certain degree of thinness.

Optionally, the first antenna 10 and the second antenna 11 are a metal frame antenna.

The metal frame on the left side of the mobile terminal is used as the second antenna 11, and the metal frame disposed above the mobile terminal is used as the first antenna 10. Through the coupling of the metal frame antenna and the LDS antenna set on the plastic bracket of the mobile terminal, a five-in-one antenna is formed (i.e., one antenna integrates the functions of GPS L1, GPS L5, Wi-Fi 2.4G, Wi-Fi 5G, and LTE B32), thus achieving the function of dual GPS (GPS L1 and GPS L5) with one antenna.

In conclusion, embodiments of the present disclosure are directed to an antenna structure for a mobile terminal. The antenna structure includes a first antenna 10, a second antenna 11, a third antenna 12, a fourth antenna 13, a fifth antenna 14, a sixth antenna 15, a matching circuit 16, and a feed point 17. A spacing area 18 is disposed between one end of the first antenna 10 and one end of the second antenna 11. A side portion of the spacing area 18 is provided with the fourth antenna 13, which is parallel to the second antenna 11, one end of the fifth antenna 14 is opposite to one end of the fourth antenna 13, a side portion of the fifth antenna 14 is provided with the third antenna 12, which is parallel to the second antenna 11, the sixth antenna 15 is connected to the third antenna 12, and a side portion of the third antenna 12 is provided with the feed point 17. The third antenna 12 is at least partially arranged in parallel with the fourth antenna 13 and at least partially arranged in parallel with the first antenna 10. The fifth antenna 14, the sixth antenna 15, and the third antenna 12 are electrically connected and intersected at a point, one end of the matching circuit 16 is connected to the fifth antenna 14, the sixth antenna 15, and the third antenna 12, and the other end of the matching circuit 16 is connected to the feed point 17. The embodiments of the present disclosure provides a metal frame antenna coupling with a laser direct structuring (LDS) antenna installed on a plastic bracket of a mobile terminal to form a five-in-one antenna (i.e., one antenna integrates the functions of GPS L1, GPS L5, Wi-Fi 2.4G, Wi-Fi 5G, and LTE B32). Only one antenna is needed to achieve dual GPS (GPS L1 and GPS L5) function, compared to using at least two antennas to achieve dual GPS function. A plurality of slots on mobile terminals of the metal machine or film injection molding machine type has been reduced, thereby improving the structural strength and visual appearance of the mobile terminal. In addition, since the five-in-one antenna is located in the upper left corner area on the back of the mobile terminal, it is less affected by the head and hand, and therefore, the performance is also good.

In the foregoing embodiments, the descriptions of each embodiment have their own emphases, and for parts not described in detail in a certain embodiment, reference may be made to relevant descriptions of other embodiments.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. An antenna structure for a mobile terminal, comprising:

a first antenna, a second antenna, a spacing area, located between the first antenna and the second antenna;

a third antenna, parallel to the second antenna;

a fourth antenna, in the spacing area and parallel to the second antenna;

a fifth antenna, spaced apart from the fourth antenna and the third antenna;

a sixth antenna, connected to the third antenna and the fifth antenna at a coupling point;

a feed point, disposed at a side of the third antenna; and a matching circuit, coupled between the coupling point and the feed point;

wherein the third antenna is at least partially arranged in parallel with the fourth antenna and at least partially arranged in parallel with the first antenna.

2. The antenna structure as claimed in claim 1, wherein the first antenna is a curved antenna, which comprises a first part antenna and a second part antenna, the spacing area is disposed between one end of the second part antenna and one end of the second part antenna, and the other end of the second part antenna is connected to the first part antenna; and the sixth antenna comprises the third antenna, the fourth antenna and the fifth antenna, the fifth antenna is relatively parallel to the fourth antenna, which is relatively parallel to the second antenna, and the third antenna is relatively parallel to the first antenna.

3. The antenna structure as claimed in claim 2, wherein a length of the first part antenna ranges between 13 mm and 17 mm, and a length of the second part antenna ranges between 10 mm to 14 mm.

4. The antenna structure as claimed in claim 2, wherein a distance between the first part antenna and a frame connected area in the mobile terminal metal ranges between 7 mm and 9 mm, and a distance between the second antenna and the frame connected area in the mobile terminal metal ranges 5 mm to 7 mm.

5. The antenna structure as claimed in claim 1, wherein a width of a slot is 1 mm.

6. The antenna structure as claimed in claim 1, wherein a length of the fourth antenna ranges between 2.5 mm and 3.5 mm, and a distance between the fourth antenna and the second antenna ranges between 0.4 mm to 0.6 mm.

7. The antenna structure as claimed in claim 1, wherein the fifth antenna comprises the sixth antenna and a seventh antenna, the sixth antenna is vertically connected to the seventh antenna, one end of the sixth antenna is opposite to one end of the fourth antenna, the sixth antenna is parallel to the second antenna, and the seventh antenna is parallel to the first antenna, a distance between a sixth part antenna and the second antenna ranges between 0.4 mm to 0.6 mm, and a seventh part antenna, the sixth antenna, and the third antenna are intersected at a point.

8. The antenna structure as claimed in claim 1, wherein a length of the second antenna ranges between 25 mm to 29 mm.

9. The antenna structure as claimed in claim 1, wherein the fifth antenna, the fourth antenna, the sixth antenna, and the third antenna are Laser Direct Structuring (LDS) antennas.

10. The antenna structure as claimed in claim 1, wherein the first antenna and the second antenna are metal frame antennas.

11. An antenna structure for a mobile terminal, comprising:

a first antenna, a second antenna, a spacing area, located between the first antenna and the second antenna;

a third antenna, parallel to the second antenna;

a fourth antenna, in the spacing area and parallel to the second antenna;

a fifth antenna, spaced apart from the fourth antenna and the third antenna;

a sixth antenna, connected to the third antenna and the fifth antenna at a coupling point;

a feed point, disposed at a side of the third antenna; and a matching circuit, coupled between the coupling point and the feed point;

wherein the third antenna is partially arranged in parallel with the fourth antenna and at least partially arranged in parallel with the first antenna;

a length of the third antenna ranges between 5 mm and 7 mm.

12. The antenna structure as claimed in claim 11, wherein the first antenna is a curved antenna, which comprises a first part antenna and a second part antenna, the spacing area is disposed between one end of the second part antenna and one end of the second part antenna, and the other end of the second part antenna is connected to the first part antenna; and the sixth antenna comprises the third antenna, the fourth antenna and the fifth antenna, the fifth antenna is relatively parallel to the fourth antenna, which is relatively parallel to the second antenna, and the third antenna is relatively parallel to the first antenna.

13. The antenna structure as claimed in claim 11, wherein a length of the first part antenna ranges between 13 mm and 17 mm, and a length of the second part antenna ranges between 10 mm to 14 mm.

14. The antenna structure as claimed in claim 11, wherein a distance between the first part antenna and a frame connected area in the mobile terminal metal ranges between 7 mm and 9 mm, and a distance between the second antenna and the frame connected area in the mobile terminal metal ranges 5 mm to 7 mm.

15. The antenna structure as claimed in claim 11, wherein a width of a slot is 1 mm.

16. The antenna structure as claimed in claim 11, wherein a length of the fourth antenna ranges between 2.5 mm and 3.5 mm, and a distance between the fourth antenna and the second antenna ranges between 0.4 mm to 0.6 mm.

17. The antenna structure as claimed in claim 11, wherein the fifth antenna comprises the sixth antenna and a seventh antenna, the sixth antenna is vertically connected to the seventh antenna, one end of the sixth antenna is opposite to one end of the fourth antenna, the sixth antenna is parallel to the second antenna, and the seventh antenna is parallel to the first antenna, a distance between a sixth part antenna and the second antenna ranges between 0.4 mm to 0.6 mm, and a seventh part antenna, the sixth antenna, and the third antenna are intersected at a point.

18. The antenna structure as claimed in claim 11, wherein a length of the second antenna ranges between 25 mm to 29 mm.

19. The antenna structure as claimed in claim 11, wherein the fifth antenna, the fourth antenna, the sixth antenna, and the third antenna are Laser Direct Structuring (LDS) antennas.

20. The antenna structure as claimed in claim 11, wherein the first antenna and the second antenna are metal frame antennas.

* * * * *